United States Patent Office 3,788,860
Patented Jan. 29, 1974

3,788,860
PROCESS FOR PRODUCING COFFEE EXTRACT
James Patrick Mahlmann, Wayne, N.J., assignor to General Foods Corporation, White Plains, N.Y.
No Drawing. Filed June 23, 1972, Ser. No. 265,891
Int. Cl. A23f 1/08
U.S. Cl. 426—433
3 Claims

ABSTRACT OF THE DISCLOSURE

A novel process for producing coffee extract by contacting progressively fresher roasted and ground coffee with an aqueous extraction liquid in the extraction columns of a percolator set is disclosed comprising contacting roasted whole coffee beans with the aqueous extraction liquid in the fresh stage of the percolator set from which coffee extract is drawn off, drawing off a quantity of coffee extract from the fresh stage thus completing a cycle, and then grinding the whole coffee beans at a point prior to contacting them with aqueous extraction liquid in the autoclave section of the percolator set.

BACKGROUND OF THE INVENTION

This invention relates to soluble coffee and more particularly to the production of coffee extract.

In the standard method of commercially producing coffee extract, progressively fresher roasted and ground coffee is contacted with an aqueous extraction liquid in the extraction columns of a percolator set. The percolator set is generally a series of five to eight extraction columns or vessels connected in series by manifolding means. The aqueous extraction liquid is fed under pressure into the extraction column containing the most spent or most extracted roasted and ground coffee, contacts this most extracted bed of coffee, exits from this column and then passes into the next adjacent column containing the next progressively freshest roasted and ground coffee or next most extracted coffee. The extraction liquid in this manner passes through successive extraction columns containing progressively fresher coffee and thus increases in soluble coffee solids as it passes through the system of extraction columns. After the extraction liquid passes through the extraction column containing the freshest or least extracted coffee in the percolator set a quantity of coffee extract is drawn-off. The extraction column containing this freshest coffee is generally referred to as the fresh stage of the percolator set. The coffee extract drawn off from the fresh stage usually contains about 20–30% soluble coffee solids by weight and is then further processed by suitable means into soluble coffee powder.

The drawing off of the coffee extract is said to complete a cycle, cycle being the time between successive draw-offs of coffee extract from the fresh stage. After completion of a cycle, the extraction column containing the most extracted roasted and ground coffee is taken off-stream and a column containing fresh coffee is placed on-stream. A new cycle is begun by feeding the extraction liquid into the extraction column containing the most extracted roasted and ground coffee, this coffee being the next most extracted coffee from the previous cycle. The extraction liquid passes through the extraction columns contacting progressively fresher roasted and ground coffee and being drawn-off from the fresh stage as coffee extract.

Successive cycles are continued in the manner described above such that a given bed of coffee becomes progressively less fresh with each cycle. It is common to refer to the percolator set as being composed of an autoclave section and an atmospheric section. The autoclave section generally comprises the most extracted coffees in the percolator set and the extraction process in this portion is designed primarily to recover a high yield of soluble coffee solids. The atmospheric section contains the fresher coffees in the percolator set and extraction conditions are such as to recover the significant portion of the desirable aromatics from these coffees (as well as coffee solids).

It is well known in the art that the process of producing coffee extract from roasted and ground coffee results in a loss, to varying degrees, of the characteristic aroma and flavor of freshly roasted and ground coffee.

SUMMARY OF THE INVENTION

It is accordingly an object of this invention to prepare a coffee extract having improved aroma and flavor characteristics.

It has been found that an extract having unique and improved flavor and aroma characteristics may be prepared by a process comprising contacting roasted whole coffee beans with the aqueous extraction liquid in the fresh stage of the percolator set from which coffee extract is drawn off and drawing off a quantity of coffee extract from the fresh stage. At some point after the whole beans are contacted with aqueous extraction liquid in this fresh stage and before they are contacted with extraction liquid in the autoclave section of the percolator set, the beans are ground and then further extracted as roasted and ground coffee in the remaining cycles.

The roasted whole beans of this invention may be any bean type, blend or color and may be either decaffeinated or undecaffeinated. The term "whole bean" is generally descriptive of coffee beans which have not yet been ground and, as used herein, includes beans which have been broken through handling or otherwise, preferably to no smaller than one-quarter of the size of the original whole bean.

By grinding of the roasted whole beans is meant reducing their size by crushing, rubbing, grating, cutting, slicing, flaking, tearing, compacting and any other process that will cause particle-size reduction and substantial breakage of the cell structure of the beans.

The fresh stage of the percolator set, that is, the stage containing the freshest coffee in the set and from which coffee extract is drawn off always contains roasted whole coffee beans. The fresh stage may be an actual extraction column of the percolator set or some other suitable extraction vessel. Relative to the overall process, however, the vessel from which coffee extract is drawn off will always contain the freshest coffee in a given cycle, whole beans in this case, and thus is referred to as the fresh stage in the set for that cycle. In other words while termed the fresh stage of the percolator set, the fresh stage extraction vessel in a given cycle may be a separate tank, dissimilar in design from the extraction columns containing roasted and ground coffee and, in fact, even physically apart. Regardless of its size or position, such a vessel constitutes the "fresh stage" of the percolator set by virtue of its being the last in a series of extraction vessels to receive extraction liquid and the vessel from which coffee extract is drawn off.

In the preferred embodiment of this invention, the whole beans are ground after being extracted in the fresh stage and are thus further extracted in subsequent cycles as roasted and ground coffee while new fresh stages containing roasted whole beans are placed on-stream. If desired, however, the whole beans may be further extracted in subsequent cycles in their whole bean form. Thus, in a given cycle, the percolator set may contain more than one vessel containing whole beans. When operating in such a manner, however, the whole beans are ground at some point prior to their being extracted in the autoclave section of the percolator set in order to insure an economical yield of soluble coffee solids for the cycle.

Further, the process of this invention is applicable to extraction processes such as dilute extraction, split extraction, and other art-recognized processes.

The coffee extract drawn-off from the fresh stage at the end of each cycle is found to have a unique and better quality flavor than coffee extract prepared by extracting roasted and ground coffee in the fresh stage. Also, it is found that many of the aromatic constituents of coffee, normally lost through grinding, are retained when the extracted roasted whole beans are subsequently ground. This retention makes available more aromatic constituents to be picked up by the aqueous extraction liquid as it passes through the percolator set. Still further, fewer coffee fines, generally troublesome due to plugging of the extraction columns with a corresponding pressure buildup, are generated when the percolation process is carried out in the manner of this invention.

DETAILED DESCRIPTION OF THE INVENTION

In the process of this invention, aqueous extraction liquid is fed to the extraction column in the percolator set containing the most extracted or most spent roasted and ground coffee. This column may be referred to as the most spent stage of the percolator set and the remaining extraction columns in the set contain progressively fresher roasted and ground coffee. The final extraction column or vessel through which the aqueous extraction liquid passes is referred to as the fresh stage and contains the least extracted or freshest coffee.

The extraction liquid is generally heated to about 220° F. to 350° F. before passing under pressure into the most spent stage of the percolator set. While the extraction liquid is generally water, it may be any water solution of solids, such as salts or coffee solids from some other convenient source.

As the extraction liquid passes through the most spent stage, it contacts the coffee contained therein and extracts soluble coffee solids from the roasted and ground coffee. The exit stream from the most spent stage generally is a dilute concentration of soluble coffee solids. This exit stream then passes into the next extraction column, this column containing the next most extracted or spent coffee in the percolator set. After contacting this roasted and ground coffee, the extraction liquid is passed through successive extraction columns containing progressively fresher or less extracted roasted and ground coffee. By contacting progressively fresher coffee within the successive extraction columns, the aqueous extraction liquid increases in soluble coffee solids concentration.

The aqueous extraction liquid is finally passed through the fresh stage of the percolator set containing roasted whole coffee beans and a predetermined quantity of coffee extract is drawn-off from this stage. The coffee extract may generally contain anywhere from about 20%–35% by weight of soluble coffee solids. The coffee extract is suitably processed into soluble coffee powder.

When the aqueous extraction liquid passes through this fresh stage and a quantity of coffee extract is drawn-off, a cycle is said to have been completed. To begin the next successive cycle, the most spent stage is taken off stream and an extraction column containing fresh roasted whole beans is placed on stream to become the fresh stage for draw-off in this cycle. Aqueous extraction liquid is then fed to the most spent stage for this cycle, the coffee contained therein being the next most spent coffee from the previous cycle. The extraction liquid passes through the successive extraction columns as in the previous cycle. The next most fresh coffee in this cycle is the now partially extracted whole beans which constituted the fresh stage in the previous cycle, and the extraction liquid, after passing through and contacting this coffee, then passes through the fresh stage for this cycle and a quantity of coffee extract is drawn-off. The cycles are continued as described with a given charge of coffee becoming progressively more extracted with each successive cycle. As previously mentioned, in order to insure a relatively economical yield and soluble solids concentration, the whole coffee beans are ground at some point prior to being extracted in the autoclave section of the percolator set.

Thus, for example, in the preferred embodiment of this invention, the whole beans are ground immediately after being contacted in the fresh stage of the percolator set. The whole beans are discharged, ground and loaded back into the same column while a new fresh stage of whole beans is placed on stream. The ground whole beans thereby become the next freshest stage in this cycle. Alternatively, the column from which the extracted whole beans are discharged may be charged with a fresh charge of whole beans while the extracted whole beans are ground and loaded into a different column which was off stream in the previous cycle.

When employing more than one column of whole beans, a new fresh stage is placed on-stream while the extracted whole beans from the previous cycle are further extracted in their whole bean form. With each cycle, a given charge of whole beans becomes progressively more extracted until it is discharged after being the most spent stage in the set. It is necessary, however, as mentioned above, to grind the whole beans before they are contacted with extraction liquid in the autoclave section of the percolator set.

Since the beans are wetted by the extraction liquid prior to grinding, it is found that particle-size reduction by cutting or slicing the beans is the preferred method. To further insure retention of the aromatics normally lost in grinding, it is also preferred to grind in an inert atmosphere and still further to grind at reduced temperatures, say, around 35° F.–45° F.

The flavor of the coffee extract drawn-off from the extraction column containing the roasted whole coffee beans is generally of better quality than coffee extract prepared according to conventional methods. It is believed that the roasted whole coffee beans extracted in the fresh stage contain many of the aromatic coffee constituents normally lost in the grinding operation. Thus, the drawn-off coffee extract is found to contain more aromatics than extract prepared according to percolation techniques employing roasted and ground coffee in the fresh stage. Further, it has been found that grinding of the roasted whole beans which have been contacted with the aqueous extraction liquid effects a better retention of aromatics which would normally be in the grinding process thereby providing more aromatic constituents to be picked up by the aqueous extraction liquid. Still further, it is found that fewer coffee fines, generally troublesome in percolation processes due to their plugging of the extraction columns and corresponding pressure build up within the column, are generated when the extracted roasted whole beans are subjected to the grinding operation. Reduction of these pressure and plugging problems results in a more efficient and uniform extraction of the roasted and ground coffee and a better quality coffee extract. It should be appreciated, of course, that the use of whole beans, as described in this invention, in an extraction vessel will decrease the loading capacity of the vessel and thereby may necessitate the use of larger vessels to achieve uniform loading capacity throughout all the columns of the set.

While the description above makes use of taking columns off-stream and putting fresh columns on-stream, the change from one cycle to the next may also be achieved by discharging the coffee contained in the most spent stage and charging this extraction column with roasted whole beans. The most spent stage in a cycle then becomes the fresh stage for the draw-off of coffee extract in the next successive cycle. Further, inter-column heaters or coolers may be employed throughout the percolator set to either raise or lower the temperature of the extraction liquid during a cycle.

The process of this invention may also be employed in a split-extraction percolation system whereby the percolator set is divided into an atmospheric section and an autoclave section. Each section has a separate feed and separate draw-off and the two fractions are combined to make up the final coffee extract or alternatively, the fractions are dried separately and combined. The autoclave section generally employs hotter extraction liquid than does the atmospheric section and generally contains the most extracted coffees in the set. According to the process of this invention, the atmospheric section of the split percolation set may contain one or more columns of whole beans while the autoclave section contains the more extracted roasted and ground coffees. When the two fractions are to be mixed after drying, it is preferred to freeze-dry the extract obtained from the atmospheric section in order to better retain the desirable coffee aromatics. Further, a split-extraction process employing three distinct sections may be employed whereby an extract is obtained solely from whole bean extraction, another from the atmospheric section of a standard split-extraction set containing ground previously extracted whole beans, and another from the autoclave section.

Dilute extraction, whereby a coffee extract of low coffee solids (about 10-20%) is obtained by increasing the amount of feed liquid may also be employed to extract whole coffee beans according to the process of this invention.

An aroma bearing fraction may be obtained from the roasted coffee according to methods well known in the art. To achieve a desirable yield of aromatics it is preferred to strip the aromatics after the whole beans have been ground and before they are contacted with aqueous extraction liquid in their ground form.

The following example is presented to illustrate the process of this invention.

EXAMPLE I

A glass column of approximately 3 inches diameter and 24 inches high was charged with 2 pounds of roasted whole coffee beans. Aqueous extraction liquid of 20% coffee solids was fed to the column at 180° F. at a rate of 110 ml./min. for thirty minutes. The wetted whole beans were then removed, ground by slicing and recharged to the column. Extraction liquid of 20% coffee solids by weight was fed to the column and four quarts of the exiting extraction liquid from this column were collected and passed into a column containing roasted whole beans. Two quarts of coffee extract from this column were collected and found to have a concentration of 26% soluble coffee solids by weight.

A second run was made employing identical processing condition but using roasted and ground coffee in the fresh stage. Aqueous extraction liquid of 20% solids concentration was passed through fresh roasted and ground coffee at 180° F. at a rate of 110 ml./min. for 30 minutes. This coffee was then further extracted with a 20% solids extraction liquid, four quarts of exiting liquid collected and passed through a column containing fresh roasted and ground coffee. Two quarts of coffee extract from this column were collected and found to have a soluble coffee solids concentration of 27% by weight.

A comparison of cups of coffee prepared from the coffee extracts obtained from the above runs showed that the extract prepared from the process of this invention, using whole beans in the fresh stage of the percolator set, resulted in a cup of coffee having an overall better coffee quality.

While this invention has been illustrated with reference to the above example and the description contained herein, it will be obvious to one skilled-in-the-art that various modifications and changes may be made without departing from the scope and spirit of this invention.

I claim:

1. In a process for producing coffee extract by counter-currently contacting progressively fresher roasted coffee with an aqueous extraction liquid in the extraction vessels of a percolator set comprised of an atmospheric section and an autoclave section wherein extraction liquid is fed to the vessel containing the most extracted roasted coffee and drawn off as coffee extract from the fresh stage extraction vessel containing the least extracted roasted coffee thus completing a cycle and wherein a new fresh stage containing roasted coffee is placed on-stream and the vessel containing the most extracted roasted coffee is taken off-stream after completion of each cycle, the improvement comprising contacting roasted whole coffee beans with the aqueous extraction liquid in the fresh stage of said percolator set and grinding the contacted whole coffee beans at a point prior to further contacting them with aqueous extraction liquid in the autoclave section of the percolator set.

2. The process of claim 1 wherein said roasted whole beans in the fresh stage are ground prior to being further contacted with aqueous extraction liquid in the next successive cycle.

3. The process of claim 2 wherein said whole beans are ground by slicing.

References Cited

UNITED STATES PATENTS

| 3,700,466 | 10/1972 | Bergeron et al. | 99—71 |
| 3,700,463 | 10/1972 | Bolt et al. | 99—71 |
| 3,021,218 | 2/1962 | Clinton et al. | 99—71 |

OTHER REFERENCES

Sivetz et al., "Coffee Processing Technology," vol. I, 1963, p. 333.

FRANK W. LUTTER, Primary Examiner

W. L. MENTLIK, Assistant Examiner

U.S. Cl. X.R.

426—518

UNITED STATES PATENT OFFICE
CERTIFICATE OF CORRECTION

Patent No. 3,788,860                Dated January 29, 1974

Inventor(s) James Patrick Mahlmann

It is certified that error appears in the above-identified patent and that said Letters Patent are hereby corrected as shown below:

In column 1, line 51, change "30%" to -- 35% --.

In column 4, line 1, after "given" insert -- fresh --.

Signed and sealed this 11th day of June 1974.

(SEAL)
Attest:

EDWARD M. FLETCHER, JR.
Attesting Officer

C. MARSHALL DANN
Commissioner of Patents